United States Patent
Mizuno et al.

(10) Patent No.: US 11,990,255 B2
(45) Date of Patent: May 21, 2024

(54) WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Housei Mizuno, Mie (JP); Ryuta Takakura, Mie (JP); Tetsuya Nishimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 166 days.

(21) Appl. No.: 17/440,356

(22) PCT Filed: Mar. 17, 2020

(86) PCT No.: PCT/JP2020/011676
§ 371 (c)(1),
(2) Date: Sep. 17, 2021

(87) PCT Pub. No.: WO2020/203252
PCT Pub. Date: Oct. 8, 2020

(65) Prior Publication Data
US 2022/0199287 A1    Jun. 23, 2022

(30) Foreign Application Priority Data
Apr. 5, 2019   (JP) ................................. 2019-072367

(51) Int. Cl.
*H01B 7/08* (2006.01)
*H01B 7/02* (2006.01)

(52) U.S. Cl.
CPC ................. *H01B 7/08* (2013.01); *H01B 7/02* (2013.01)

(58) Field of Classification Search
CPC ....................................................... H01B 7/08
See application file for complete search history.

(56) References Cited

U.S. PATENT DOCUMENTS 4,000,348 A * 12/1976 Harlow ................. B32B 27/322
156/333
4,308,421 A * 12/1981 Bogese, II ........... H01B 7/0823
174/32

(Continued)

FOREIGN PATENT DOCUMENTS

CN     104620327    5/2015
JP     63-8522      1/1988

(Continued)

OTHER PUBLICATIONS

China Office Action issued in China Patent Application No. 202080023962.2, dated Dec. 21, 2022, together with English translation thereof.

(Continued)

*Primary Examiner* — Chau N Nguyen
(74) *Attorney, Agent, or Firm* — GREENBLUM & BERNSTEIN, P.L.C.

(57) ABSTRACT

A wiring member includes a sheet member including a first layer and a second layer, a first wire-like transmission member, and a second wire-like transmission member. A constituent material of the first layer and a constituent material of the second layer are different from each other. A material of a surface of the first wire-like transmission member and a material of a surface of the second wire-like transmission member are different from each other. The first wire-like transmission member is welded to the constituent (Continued)

material of the first layer, and the second wire-like transmission member is welded to the constituent material of the second layer.

8 Claims, 6 Drawing Sheets

(56) References Cited

U.S. PATENT DOCUMENTS

| | | |
|---|---|---|
| 8,092,897 B2 | 1/2012 | Honma et al. |
| 8,415,007 B2 | 4/2013 | Honma et al. |
| 10,867,721 B2 | 12/2020 | Ishida et al. |
| 2015/0235734 A1 | 8/2015 | Takata et al. |

FOREIGN PATENT DOCUMENTS

| | | | |
|---|---|---|---|
| JP | 10-223056 | | 8/1998 |
| JP | 2007-092072 | | 4/2007 |
| JP | 2012-117158 | | 6/2012 |
| JP | 2017-536681 | | 12/2017 |
| JP | 2018-137208 | | 8/2018 |
| WO | WO 2015/123863 | * | 8/2015 |
| WO | 2016/086404 | | 6/2016 |

OTHER PUBLICATIONS

International Search Report issued in International Patent Application No. PCT/JP2020/011676, dated Jun. 9, 2020, along with an English translation thereof.

* cited by examiner

F I G. 4
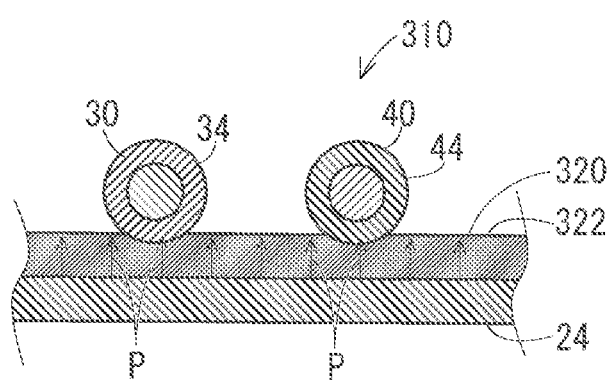

WIRING MEMBER

TECHNICAL FIELD

The present disclosure, relates to a wiring member.

BACKGROUND ART

Patent Document 1 discloses a wire harness including: a functional exterior member formed into a sheet-like shape; and an electrical wire disposed to overlap with the functional exterior member in at least a part of a region along a longitudinal direction, wherein at least a part of a portion where an insulating covering of the electrical wire and the functional exterior member overlap with each other is welded.

Patent Document 2 discloses a fiber-reinforced resin laminated body reinforced by a reinforced fiber group made up of a number of continuous filaments and a thermal adhesion body member applied to a method of manufacturing the laminated body.

PRIOR ART DOCUMENTS

Patent Documents

Patent Document 1: Japanese Patent Application Laid Open No. 2018-137208
Patent Document 2: Japanese Patent Application Laid-Open No. 2007-092072

SUMMARY

Problem to be Solved by the Invention

A wire-like transmission member with a covering made of a different covering material is used in some cases. In this case, it is desired that the wire-like transmission member with the different covering material is favorably welded to a sheet member.

Accordingly, an object of the present disclosure is to favorably weld a wire-like transmission member with a different covering material to a sheet member.

Means to Solve the Problem

A wiring member according to the present disclosure includes: a sheet member including a first layer and a second layer; a first wire-like transmission member; and a second wire-like transmission member, wherein a constituent material of the first layer and a constituent material of the second layer are different from each other, a material of a surface of the first wire-like transmission member and a material of a surface of the second wire-like transmission member are different from each other, the first wire-like transmission member is welded to the constituent material of the first layer, and the second wire-like transmission member is welded to the constituent material of the second layer.

Effects of the Invention

According to the present disclosure, the wire-like transmission members each having the surface material different from each other are favorably welded to the sheet member.

BRIEF DESCRIPTION OF DRAWINGS

FIG. 4 is a schematic cross-sectional view illustrating a wiring member according to an embodiment 2.

DESCRIPTION OF EMBODIMENT(S)

Description of Embodiment of Present Disclosure

Figure 1:
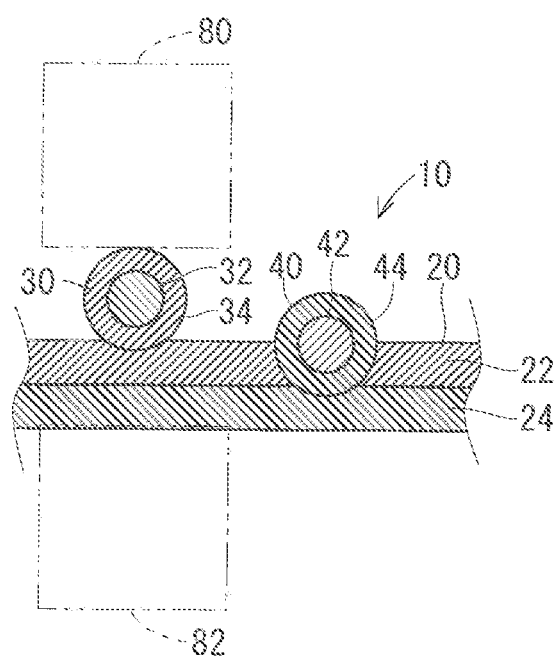
FIG. 1 is a schematic cross-sectional view illustrating a wiring member according to an embodiment 1.

Embodiments of the present disclosure are listed and described firstly.

A wiring member according to the present disclosure is as follows.

(1) A wiring member includes: a sheet member including a first layer and a second layer; a first wire-like transmission member; and a second wire-like transmission member, wherein a constituent material of the first layer and a constituent material of the second layer are different from each other, a material of a surface of the first wire-like transmission member and a material of a surface of the second wire-like transmission member are different from each other, the first wire-like transmission member is welded to the constituent material of the first layer, and the second wire-like transmission member is welded to the constituent material of the second layer.

According to this wiring member, the first wire-like transmission member is welded to the constituent material of the first layer, and the second wire-like transmission member is welded to the constituent material of the second layer. Thus, the first wire-like transmission member can be welded to the first layer which can be favorably welded to the material of the surface of the first wire-like transmission member. The second wire-like transmission member can be welded to the second layer which can be favorably welded to the material of the surface of the second wire-like transmission member.

(2) The second wire-like transmission member may be embedded into the first layer to be welded to the second layer from a side of the first layer. The second wire-like transmission member is welded to the second layer from the side of the first layer.

(3) A melting point of the constituent material of the first layer may be lower than a melting point of the constituent material of the second layer. Accordingly, the second wire-like transmission member is embedded into the first layer to be easily welded to the second layer from the side of the first layer.

(4) The second wire-like transmission member may be thicker than the first wire-like transmission member. The second wire-like transmission member is thicker than the first wire-like transmission member, thus the second wire-like transmission member is easily welded to the second layer. A thickness of the wiring member can be reduced compared with a case where a thickness relationship between the wire-like transmission members is reversed.

(5) It is applicable that the first layer is a fiber layer, and the second wire-like transmission member is welded to a portion of the constituent material of the second layer seeping into the fiber layer. The second wire-like transmission member is welded to the constituent material of the second layer in a state of being located on a side of a main surface of the fiber layer opposite to the second layer.

(6) A melting point of the constituent material of the first layer may be higher than a melting point of the constituent material of the second layer. The constituent material of the second layer easily seeps into the fiber layer while leaving structure of the fiber layer.

(7) It is applicable that the first wire-like transmission member is welded to the first layer from a side opposite to the second layer, and the second wire-like transmission member is welded to the second layer from a side opposite to the first layer. Accordingly, the wire-like transmission members with different covering materials are favorably welded to a front side and a back side of the sheet member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring member according to an embodiment 1 is described hereinafter. FIG. 11 is a schematic cross-sectional view illustrating a wiring member 10. FIG. 1 illustrates a horn 80 and an anvil 82 for ultrasonic welding by dashed-two dotted lines.

The wiring member 10 includes a sheet member 20, a first wire-like transmission member 30, and a second wire-like transmission member 40.

The sheet member 20 is formed into a thin sheet-like shape. A shape of the sheet member 20 is not particularly limited. For example, the sheet member 20 may be formed into a band-like shape, or a shape of a combination of a band-like portion and a quadrangular portion. The first wire-like transmission member 30 and the second wire-like transmission member 40 are held along a predetermined route in the sheet member 20.

The sheet member 20 includes a first layer 22 and a second layer 24. The first layer 22 and the second layer 24 extend in the same shape. The first layer 22 and the second layer 24 overlap with each other. The second layer 24 may partially overlap with the first layer 22. The first layer 22 may partially overlap with the second layer 24. A constituent material of the first layer 22 and a constituent material of the second layer 24 are different from each other.

A method of forming the sheet member 20 including the first layer 22 and the second layer 24 is not particularly limited. For example, the sheet member 20 may be manufactured by a coextrusion method of extruding a portion constituting the first layer 22 and a portion constituting the second layer 24 from different extrusion machines and stacking these portions in a die. For example, the sheet member 20 may be formed by a lamination method of once forming a portion constituting the first layer 22 and a portion constituting the second layer 24 separately as sheet-like portions and subsequently bonding the sheet-like portions.

The first wire-like transmission member 30 and the second wire-like transmission member 40 are wire-like members transmitting an electrical power or light, for example, that is to say, wire-like transmission members. For example, the wire-like transmission member may be a general wire having a core wire and a covering around the core wire. For example, the wire-like transmission member may be a shield wire in which a plurality of electrical wires are covered by a shielding layer such as a braid and an external covering. The wire-like transmission member may be a twisted wire made up of the plurality of electrical wires which are stranded. The wire-like transmission member may be an optical fiber, for example.

The wire-like transmission member transmitting an electrical power may be various kinds of signal lines or various kinds of power lines. The wire-like transmission member transmitting the electrical power may be used as an antenna or coil, for example, transmitting or receiving a signal or an electrical power to or from a space. The wire-like transmission member may be a single wire-like object or a composite object of a plurality of wire-like objects (a twisted wire or a cable made up of a plurality of wire-like objects covered by a sheath).

Described herein as an example is that the first wire-like transmission member 30 is a first electrical wire 30 including a core wire 32 and a covering 34 for covering the core wire 32. Described herein as an example is that the second wire-like transmission member 40 is a second electrical wire 40 including a core wire 42 and a covering 44 for covering the core wire 42.

A material of a surface of the first electrical wire 30 and a material of a surface of the second electrical wire 40 are different from each other. The covering 34 is exposed to the surface of the first electrical wire 30. Thus, the material of the surface of the first electrical wire 30 is a material forming the covering 34. The covering 44 is exposed to the surface of the second electrical wire 40. Thus, the material of the surface of the second electrical wire 40 is a material forming the covering 44. When each of the coverings 34 and 44 has a multilayer structure, a material constituting an outermost peripheral part thereof is a material of the surface of the first electrical wire 30 or a material of the surface of the second electrical wire 40.

The material of the surface of the first electrical wire 30 is a material which can be welded to the first hoer 22 more favorably than the second layer 24. Herein, a state where the material of the surface of the first electrical wire 30 can be welded to the first layer 22 more favorably than the second layer 24 may be considered as follows. That is to say this state may also be considered to indicate that when the first electrical wire 30 is welded to the first layer 22 or the second layer 24 under the same condition, fixing strength between the first electrical wire 30 and the first layer 22 is larger than fixing strength between the first electrical wire 30 and the second layer 24.

The material of the surface of the second electrical wire 40 is a material which can be welded to the second layer 24 more favorably than the first layer 22. Herein, a state where the material of the surface of the second electrical wire 40 can be welded to the second layer 24 more favorably than the first layer 22 may be considered as follows. That is to say, this state may also be considered to indicate that when the second electrical wire 40 is welded to the first layer 22 or the second layer 24 under the same condition, fixing strength between the second electrical wire 40 and the second layer 24 is larger than fixing strength between the second electrical wire 40 and the first layer 22.

For example, when the material of the surface of the first electrical wire 30 and the first layer 22 are made up of the same resin, the first electrical wire 30 is favorably welded to the first layer 22. For example, when the material of the surface of the second electrical wire 40 and the second layer 24 are made up of the same resin, the second electrical wire 40 is favorably welded to the second layer 24. The resin having a different polymerization degree and amount of additive agent, for example, is deemed to be the same resin.

For example, polyvinyl chloride (PVC) and olefin resin (polypropylene (PP) and polyethylene (PE)) may be used as the material of the surface of the first electrical wire 30 and the material of the surface of the second electrical wire 40. In this case, it is applicable that the first electrical wire 30 and the first layer 22 are made up of one of PVC, PP, and PE and the second electrical wire 40 and the second layer 24 are made up of another one of PVC, PP, and PE.

In the present embodiment, the first electrical wire 30 and the second electrical wire 40 are fixed to the sheet member 20 from a side of the first layer 22. Arrangement routes of the first electrical wire 30 and the second electrical wire 40 are optionally set. The first electrical wire 30 and the second electrical wire 40 may be disposed along a linear route, a curved route, or a route in which a linear route and a curved route are combined. The first electrical wire 30 and the second electrical wire 40 may be disposed along routes different from each other.

The first electrical wire 30 is welded to the constituent material of the first layer 22. Herein, the first electrical wire 30 is welded to the first layer 22 in a state of being in contact with the first layer 22 from a side opposite to the second layer 24. In a portion where the first electrical wire 30 and the first layer 22 are welded, only one of or both the covering 34 and the first layer 22 may be melted. In a case where both the covering 34 and the first layer 22 are melted, any of them may be incited more than the other one.

The second electrical wire 40 is welded to the constituent material of the second layer 24. Herein, the first electrical wire 30 is welded to the second layer 24 in a state of being in contact with the second layer 24 from a side of the first layer 22. More specifically, the second electrical wire 40 is embedded into first layer 22 to be welded to the second layer 24 from the side of the first layer 22. In a portion where the second electrical wire 40 and the second layer 24 are welded, only one of or both the covering 44 and the second layer 24 may be melted. In a case where both the covering 44 and the second layer 24 are melted, any of them may be melted more than the other one.

A configuration that the second electrical wire 40 is embedded into the first layer 22 to reach the second layer 24 is achieved by melting the first layer 22 at the same time as the welding of the second electrical wire 40 to the second layer 24, for example.

That is to say, the first electrical wire 30 does not pass through the first layer 22 when the first electrical wire 30 is welded to the first layer 22. When the second electrical wire 40 is welded to the second layer 24, the second electrical wire 40 passes through the first layer 22. A melting point of the constituent material of the first layer 22 is preferably lower than that of the constituent material of the second layer 24 to easily achieve the relationship of passing through the first layer 22. For example, a melting point of PVC is within a range of 85 to 210° C., a melting point of PP is within a range of 160 to 170° C., and a melting point of high density PE in PE is within a range of 120 to 140° C. Thus, for example, it is applicable that PVC is used as the material of the covering 34 of the first electrical wire 30 and the first layer 22, PP or high density PE is used as the material of the covering 44 of the second electrical wire 40 and the second layer 24, and a melting point of the former material is set lower than the melting point of the latter material.

The welding of the first electrical wire 30 and the second electrical wire 40 to the sheet member 20 can be performed by thermal welding of heating a bonding position. Ultrasonic welding, heating-pressurizing welding, hot air welding, and high frequency welding, for example, may be adopted as the thermal welding.

FIG. 1 illustrates a state where the horn 80 and the anvil 82 for ultrasonic welding are disposed to sandwich the sheet member 20 and the first electrical wire 30. The horn 80 is a member providing a contact portion between the sheet member 20 and the first electrical wire 30 with ultrasonic vibration. The anvil 82 is a member supporting a processed object from a side opposite to the horn 80.

In performing the ultrasonic welding, the sheet member 20 and the first electrical wire 30 are sandwiched between the horn 80 and the anvil 82. Herein, the horn 80 is disposed on a side of the first electrical wire 30 and the anvil 82 is disposed on a side of the sheet member 20. In this state, the contact portion between the sheet member 20 and the first electrical wire 30 is provided with the ultrasonic vibration by the horn 80. Accordingly, a friction heat is generated in the contact portion between the sheet member 20 and the first electrical wire 30. At least one of the first layer 22 of the sheet member 20 and the covering 34 of the first electrical wire 30 is melted, thus these members are welded.

When the sheet member 20 and the second electrical wire 40 are welded, the first layer 22 is melted by the friction heat. At this time, as described above, when the melting point of the material of the first layer 22 is lower than the melting point of the material of the surface of the second electrical wire 40, the second layer 24 can be mainly melted while melting the second electrical wire 40 as less as possible. The first layer 22 is melted, thus the second electrical wire 40 is embedded into the first layer 22. When the second electrical wire 40 passes through the first layer 22, the second electrical wire 40 has contact with the second layer 24. The contact portion is further provided with the ultrasonic vibration in this state, thus the second electrical wire 40 and second layer 24 are welded.

Thermal energy (ultrasonic energy) supplied when the sheet member 20 and the second electrical wire 40 are welded may be larger than thermal energy (ultrasonic energy) supplied when the sheet member 20 and the first electrical wire 30 are welded. Accordingly, the first layer 22 can be effectively melted in the contact portion between the first layer 22 and the second electrical wire 40. The second layer 24 and the material of the surface of the second electrical wire 40 relatively having a high melting point can be effectively melted and welded.

The welding position of the first electrical wire 30 and the second electrical wire 40 may be continuously or intermittently located in an extension direction of each electrical wire.

According to the wiring member 10, the first electrical wire 30 is welded to the constituent material of the first layer 22. The second electrical wire 40 is welded to the constituent material of the second layer 24. Thus, the first electrical wire 30 and the second electrical wire 40 are welded to the different constituent materials, respectively, of the sheet member 20. That is to say, the first electrical wire 30 can be welded to the constituent material of the first layer 22 which can be favorably welded to the material of the surface of the first electrical wire 30. The second electrical wire 40 can be welded to the constituent material of the second layer 24 which can be favorably welded to the material of the surface of the second electrical wire 40. Accordingly, the electrical wires 30 and 40 having the different surface materials are favorably welded to the sheet member 20.

The second electrical wire 40 is embedded into first layer 22 to be welded to the second layer 24 from the side of the first layer 22. Thus, even when the second layer 24 is covered by the other layer, the second electrical wire 40 is welded to the second layer 24. As a result, for example, the first electrical wire 30 and the second electrical wire 40 can be fixed to the side of the same main surface of the sheet member 20.

The melting point of the constituent material of the first layer 22 is lower than that of the constituent material of the second layer 24. Thus, the first layer 22 can be easily melt when the second electrical wire 40 is welded to the second layer 24. Accordingly, the second electrical wire 40 is embedded into first layer 22 to be easily welded to the second layer 24 from the side of the first layer 22.

Figure 2:
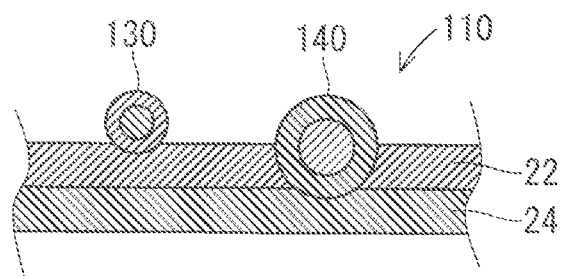
FIG. 2 is a schematic cross-sectional view illustrating a wiring member according to a modification example of the embodiment 1.

In FIG. 1 according to the embodiment 1 described above, the first electrical wire 30 and the second electrical wire 40 are illustrated to have the same thickness. The first electrical wire 30 and the second electrical wire 40 may have thicknesses different from each other. In this case, a second electrical wire 140 corresponding to the second electrical wire 40 may be thicker than a first electrical wire 130 corresponding to the first electrical wire 30 as with a wiring member 110 according to a modification example illustrated in FIG. 2. In this case, the relatively thin first electrical wire 130 is welded to the first layer 22. The relatively thick second electrical wire 140 is embedded into the first layer 22 to be welded to the second layer 24.

Thus, the relatively thick second electrical wire 140 easily passes through the first layer 22 to be welded to the second layer 24.

A dimension of the relatively thick second electrical wire 140 protruding from the sheet member 20 is reduced. Accordingly, the thickness of the portion of the wiring member 110 to which the second electrical wire 140 is welded can be reduced. The relatively thin first electrical wire 130 is welded to the first layer 22, and the relatively thick second electrical wire 140 is embedded into the first layer 22 to be welded to the second layer 24, thus an overall thickness of the wiring member 110 can be reduced.

Figure 3:
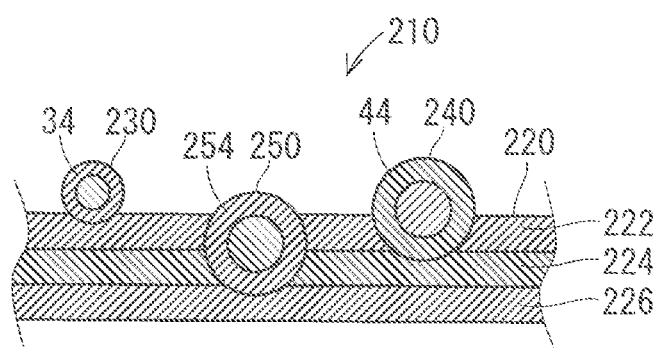
FIG. 3 is a schematic cross-sectional view illustrating a wiring member according to another modification example of the embodiment 1.

Described in the embodiment 1 described above is a case where the sheet member 20 has a double layered structure of the first layer 22 and the second layer 24. A sheet member 220 corresponding to the sheet member 20 may have a structure of three or more layers as with a wiring member 210 according to a modification example illustrated in FIG. 3.

Herein, the sheet member 220 includes a first layer 222, a second layer 224, and a third layer 226. The wiring member 210 includes a first electrical wire 230, a second electrical wire 240, and a third electrical wire 250.

A constituent material of the first layer 222, a constituent material of the second layer 224, and a constituent material of the third layer 226 are different from each other. A material of a surface of the first electrical wire 230, a material of a surface of the second electrical wire 240, and a material of a surface of the third electrical wire 250 are different from each other.

The material of the surface of the first electrical wire 230 is a material which can be welded to the first layer 222 more favorably than the second layer 224 and the third layer 226. The material of the surface of the second electrical wire 240 is a material which can be welded to the second layer 224 more favorably than the first layer 222 and the third layer 226. The material of the surface of the third electrical wire 250 is a material which can be welded to the third layer 226 more favorably than the first layer 222 and the second layer 224.

For example, the material of the surface of the first electrical wire 230 and the first layer 222 are made up of the same resin. For example, the material of the surface of the second electrical wire 240 and the second layer 224 are made up of the same resin. For example, the material of the surface of the third electrical wire 250 and the third layer 226 are made up of the same resin.

For example, the first electrical wire 230 and the first layer 222 are made up of one of PVC, PP, and PE the second electrical wire 240 and the second layer 224 are made up of another one of PVC, PP, and PE, and the third electrical wire 250 and the third layer 226 are made up of still another one of PVC, PP, and PE.

Also in the present embodiment, the first electrical wire 230, the second electrical wire 240, and the third electrical wire 250 are fixed to the sheet member 220 from a side of the first layer 222.

The first electrical wire 230 is welded to the constituent material of the first layer 222. Herein, the first electrical wire 230 is welded to the first layer 222 in a state of being in contact with the first layer 222 from a side opposite to the second layer 224.

The second electrical wire 240 is welded to the constituent material of the second layer 224. Herein, the second electrical wire 240 is welded to the second layer 224 in a state of being in contact with the second layer 224 from a side opposite to the first layer 222. More specifically, the second electrical wire 240 is embedded into first layer 222 to be welded to the second layer 224 from the side of the first layer 222.

The third electrical wire 250 is welded to the constituent material of the third layer 226. Herein, the third electrical wire 250 is welded to the third layer 226 in a state of being in contact with the third layer 226 from a side of the first layer 222 and the second layer 224. More specifically, the third electrical wire 250 is embedded into the first layer 222 and the second layer 224 to be welded to the third layer 226 from the side of the first layer 222 and the second layer 224.

A configuration that the third electrical wire 250 is embedded into the first layer 222 and the second layer 224 to reach the third layer 226 is achieved by melting the first layer 222 and the second layer 224 at the same time as the welding of the third electrical wire 250 to the third layer 226 in the manner similar to that described above.

A melting point of the first layer 222, a melting point of the second layer 224, and a melting point of the third layer 226 preferably increase in this order to easily achieve the above configuration. For example, a melting point of PVC is within a range of 85 to 210° C., a melting point of PP is within a range of 160 to 170° C., and a melting point of high density PE in PE is within a range of 120 to 140° C. Thus, PVC may be used as the material of the covering 34 of the first electrical wire 230 and the first layer 222, for example. High density, PE may be used as the material of the covering 44 of the second electrical wire 240 and the second layer 224. PP may be used as the material of the covering 254 of the third electrical wire 250 and the third layer 226. The melting point may be set to be increased in the order of the above description based on these results.

The present modification example can be considered to have a configuration that the third layer 226 and the third electrical wire 250 are added to the embodiment described above.

In the similar manner, it is sufficient that when the number of types of a covering material of an electrical wire fixed to a sheet member increases, the number of layers of the sheet members is increased in accordance with the number of types of the covering material. Accordingly, even when the number of types of the covering material of the electrical wire fixed to the sheet member increases, the electrical wire of each covering material is favorably welded to the sheet member.

Embodiment 2

A wiring member according to an embodiment 2 is described. In the following description of the present embodiment, the same reference numerals are assigned to the similar constituent elements described in the embodiment 1, and the description thereof will be omitted.

FIG. 4 is a schematic cross-sectional view illustrating a wiring member 310 according to the embodiment 2. The wiring member 310 includes a sheet member 320, the first electrical wire 30, and the second electrical wire 40. The sheet member 320 includes a first layer 322 and the second layer 24.

The present embodiment 2 is different from the embodiment 1 in that the first layer 322 is a fiber layer 322. The fiber layer 322 is a layer made up of a plurality of fibers. The fiber layer 322 may be a non-woven layer. The non-woven layer is a portion in which the plurality of fibers are not woven but intertwined to be formed in layers. The fiber layer 322 may be a woven cloth-like layer in which threads are arranged in a matrix or a woven fabric-like layer in which threads are woven.

When the fiber layer 322 and the second layer 24 are melted by heat or a solvent and bonded, a melted portion of resin constituting the second layer 24 enters gaps in the fiber layer 322. Accordingly, the fiber layer 322 and the second layer 24 are firmly bonded easily.

The first electrical wire 30 and the second electrical wire 40 are fixed to the sheet member 320 from a side of the fiber layer 322. The material of the surface of the first electrical wire 30 is a material Which can be welded to the fiber layer 322 more favorably than the second layer 24. The material of the surface of the second electrical wire 40 is a material which can be welded to the second layer 24 more favorably than the fiber layer 322. For example, the material of the surface of the first electrical wire 30 and the fiber layer 322 are made up of the same resin. For example, the material of the surface of the second electrical wire 40 and the second layer 24 are made up of the same resin. For example, the first electrical wire 30 and the fiber layer 322 are made up of one of PVC, PP, and PE and the second electrical wire 40 and the second layer 24 are made up of another one of PVC, PP and PE.

The first electrical wire 30 is welded to a constituent material of the fiber layer 322. Herein, the first electrical wire 30 is welded to the fiber layer 322 in a state of being in contact with the fiber layer 322 from a side opposite to the second layer 24. In a portion where the first electrical wire 30 and the fiber layer 322 are welded, only one of or both the covering 34 and the fiber layer 322 may be melted. In a case where both the covering 34 and the fiber layer 322 are melted, any of them may be melted more than the other one.

The second electrical wire 40 is welded to the constituent material of the second layer 24. Herein, the second electrical wire 40 is in contact with the fiber layer 322 from the side opposite to the second layer 24. That is to say, the second electrical wire 40 does not pass through the fiber layer 322 to have contact with the second layer 24. The second electrical 40 may be embedded into the fiber layer 322.

The constituent material of the second layer 24 seeps into the fiber layer 322 (refer to an arrow sign P in FIG. 4). The second electrical wire 40 is welded to a portion of the constituent material of the second layer 24 seeping into the fiber layer 322. The second electrical wire 40 may be welded to a portion of the constituent material of the second layer 24 seeping into a surface of the fiber layer 322 (a surface on a side opposite to the second layer 24). It is also applicable that the second electrical wire 40 is embedded into substantially a middle portion of the fiber layer 322 in a thickness direction, and welded to a portion of the constituent material of the second layer 24 seeping into a middle portion of the fiber layer 322 in the thickness direction.

The configuration of the constituent material of the second layer 24 seeping into the fiber layer 322 may be formed when the fiber layer 322 and the second layer 24 are bonded. The configuration of the constituent material of the second layer 24 seeping into the fiber layer 322 may be formed when the second electrical wire 40 is welded to the sheet member 320.

The first electrical wire 30 and the second electrical wire 40 can be welded to the sheet member 320 by thermal welding such as ultrasonic welding, heating-pressurizing welding, hot air welding, and high frequency welding, for example, as with the case in the embodiment 1.

According to the present embodiment, a function effect similar to that in the embodiment 1 can be obtained except that the second electrical wire 40 is embedded into the first layer 22 to be directly bonded to the second layer 24.

A portion of the constituent material of the second layer 24 seeping into the fiber layer 322 is bonded to the second electrical wire 40 in the fiber layer 322. Thus, the second electrical wire 40 is welded to the constituent material of the second layer 24 in a state of being located on a side of a main surface of the fiber layer 322 opposite to the second layer 24. As a result, the first electrical wire 30 and the second electrical wire 40 are fixed to the sheet member 320 at substantially the same height position.

The melting point of the constituent material of the fiber layer 322 is preferably higher than that of the second layer 24. For example, a melting point of PVC is within a range of 85 to 210° C., a melting point of PP is within a range of 160 to 170° C., and a melting point of high density PE in PE is within a range of 120 to 140° C. Thus, for example, it is applicable that PP is used as the material of the covering 34 of the first electrical wire 30 and the fiber layer 322, PVC or high density PE is used as the material of the covering 44 of the second electrical wire 40 and the second layer 24, and a melting point of the former material is set lower than the melting point of the latter material.

Accordingly, the constituent material of the second layer 24 easily seeps into the fiber layer 322 while leaving structure of the fiber layer 322. In this case, the structure of the fiber layer 322 remains to some extent, thus an original function of the fiber layer 322 such as acoustic insulation properties can be maintained.

Figure 5:
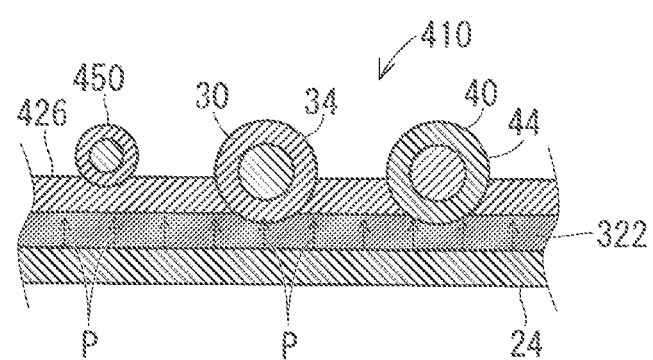
FIG. 5 is a schematic cross-sectional view illustrating a wiring member according to a modification example of the embodiment 2.

FIG. 5 is a schematic cross-sectional view illustrating a wiring member 410 according to a modification example the embodiment 2. In the present wiring member 410, an additional layer 426 is added to the sheet member 320 in the embodiment 2. An additional electrical wire 450 is added.

The additional layer 426 overlaps with the fiber layer 322 on a side opposite to the second layer 24. The additional layer 426 and the fiber layer 322 can be bonded by a configuration similar to the configuration of bonding the fiber layer 322 and the second layer 24.

A material of a surface of the additional electrical wire 450 is a material appropriate for being welded to the additional layer 426. That is to say, the material of the surface of the additional layer 425 is a material which can be welded to the additional layer 426 more favorably than the fiber layer 322 and the second layer 24. For example, a material of a surface of the additional electrical wire 450 is the same as a constituent material of the additional layer 426.

Herein, the additional electrical wire 450 is thinner than the first electrical wire 30 and the second electrical wire 40. The additional electrical wire 450 may have the same thicknesses as the first electrical wire 30 and the second electrical wire 40. The additional electrical wire 450 may be thicker than the first electrical wire 30 and the second electrical wire 40.

The additional electrical wire 450 is welded to the additional layer 426 from a side opposite to the fiber layer 322 and the second 24. The first electrical wire 30 passes through the additional layer 426 in a state be being embedded into the additional layer 426 to be welded to the fiber layer 322. The second electrical wire 40 passes through the additional layer 426 in a state be being embedded into the additional layer 426 to have contact with the fiber layer 322. The second electrical wire 40 is welded to a portion of the constituent material of the second layer 40 seeping into the fiber layer 322.

A melting point of the constituent material of the fiber layer 322 is preferably higher than a melting point of the additional layer 426. For example, it is applicable that PP is used as the material of the covering 34 of the first electrical wire 30 and the fiber layer 322, PVC or high density PE is used as the material of the covering 44 of the additional electrical wire 450 and the additional layer 426, and a melting point of the former material is set higher than the melting point of the latter material. The material of the covering 44 of the additional electrical wire 450 and the additional layer 426 and the material of the second electrical wire 40 and the second layer 24 may be the same as each other.

Melting points of the additional layer 426 and the additional electrical wire 450 may be set lower than melting points of the second layer 24 and the second electrical wire 40 to melt the additional layer 426 most easily. For example, it is applicable that PVC is used as the material of the additional layer 426 and the additional electrical wire 450, high density PE is used as the material of the covering 44 of the second electrical wire 40 and the second layer 24, and a melting point of the former material is set lower than the melting point of the latter material.

In the present modification example, it can be considered that the additional layer 426 and the additional electrical wire 450 are the first layer 22 and the first electrical wire 30 in the embodiment 1, and the first layer 22 and the first electrical wire 30 are the second layer 24 and the second electrical wire 40 in the embodiment 1. That is to say, the present modification example can be considered an example of combining the embodiment 1 with the embodiment 2.

Embodiment 3

A wiring member according to an embodiment 3 is described, in the following description of the present embodiment, the same reference numerals are assigned to the similar constituent elements described in the embodiment 1, and the description thereof will be omitted.

Figure 6:
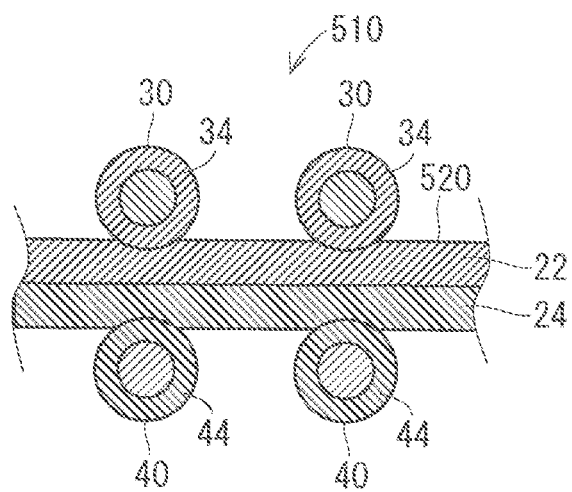
FIG. 6 is a schematic cross-sectional view illustrating a wiring member according to an embodiment 3.

FIG. 6 is a schematic cross-sectional view illustrating a wiring member 510 according to the embodiment 3. The wiring member 510 includes a sheet member 520, the first electrical wire 30, and the second electrical wire 40. The sheet member 520 includes the first layer 22 and the second layer 24.

The wiring member 510 according to the present embodiment 3 is different from the wiring member 10 according to the embodiment 1 in that the first electrical wire 30 is welded to the first layer 22 from a side opposite to the second layer 24, and the second electrical wire 40 is welded to the second layer 24 from a side opposite to the first layer 22.

Examples of a constituent material of the surfaces of the first layer 22 and the first electrical wire 30 and a constituent material of the surfaces of the second layer 24 and the second electrical wire 40 are similar to those in the embodiment 1. Any one of those melting points of the materials may be higher than the other one.

According to the present wiring member 510, the first electrical wire 30 can be welded to the constituent material of the first layer 22 which can be favorably welded to the material of the surface of the first electrical wire 30. The second electrical wire 40 can be welded to the constituent material of the second layer 24 which can be favorably welded to the material of the surface of the second electrical wire 40. Accordingly, the electrical wires 30 and 40 having the different surface materials are favorably welded to the sheet member 520.

Accordingly, the first electrical wire 30 and the second electrical wire 40 having the different covering materials are favorably welded to the front and back sides of the sheet member 520.

Modification Example

Each configuration described in the above embodiments and modification examples thereof can be appropriately combined as long as they are not contradictory. For example, in the embodiment 1, or the embodiment 2, the other electrical wire may be welded to the second layer from a side opposite to the first layer in the manner similar to that in the embodiment 3.

EXPLANATION OF REFERENCE SIGNS 10 wiring member
20 sheet member
34 first layer
324 second layer
30 first electrical wire (first wire-like transmission member)
32 core wire
34 covering
40 second electrical wire (second wire-like transmission member)
42 core wire
44 covering
80 horn
82 anvil
110 wiring member
130 first electrical wire
140 second electrical wire
210 wiring member
220 sheet member
222 first layer 224 second layer
226 third layer
230 first electrical wire
240 second electrical wire
250 third electrical wire
254 covering
310 wiring member
320 sheet member
322 fiber layer (first layer)
410 wiring member
426 additional layer
450 additional electrical wire
510 wiring member
520 sheet member

The invention claimed is:

1. A wiring member, comprising:
a sheet member including a first layer and a second layer overlapping each other in a thickness direction of the sheet member;
a first wire-like transmission member including an outer peripheral surface of a first material; and
a second wire-like transmission member including an outer peripheral surface of a second material; wherein
a constituent material of the first layer and a constituent material of the second layer are different from each other,
the first material of the outer peripheral surface of the first wire-like transmission member and the second material of the outer peripheral surface of the second wire-like transmission member are different from each other,
the first wire-like transmission member is welded to the constituent material of the first layer,
the second wire-like transmission member is welded to the constituent material of the second layer, and
the second wire-like transmission member is not welded to the constituent material of the first layer.

2. The wiring member according to claim 1, wherein the first wire-like transmission member does not contact the constituent material of the second layer.

3. A wiring member, comprising:
a sheet member including a first layer and a second layer;
a first wire-like transmission member; and
a second wire-like transmission member, wherein
a constituent material of the first layer and a constituent material of the second layer are different from each other,
a material of a surface of the first wire-like transmission member and a material of a surface of the second wire-like transmission member are different from each other,
the first wire-like transmission member is welded to the constituent material of the first layer,
the second wire-like transmission member is welded to the constituent material of the second layer, and
the second wire-like transmission member is embedded into the first layer to be welded to the second layer from a side of the first layer.

4. The wiring member according to claim 3, wherein a melting point of the constituent material of the first layer is lower than a melting point of the constituent material of the second layer.

5. The wiring member according to claim 3, wherein the second wire-like transmission member is thicker than the first wire-like transmission member.

6. A wiring member, comprising:
a sheet member including a first layer and a second layer;
a first wire-like transmission member; and
a second wire-like transmission member, wherein
a constituent material of the first layer and a constituent material of the second layer are different from each other,
a material of a surface of the first wire-like transmission member and a material of a surface of the second wire-like transmission member are different from each other,
the first wire-like transmission member is welded to the constituent material of the first layer,
the second wire-like transmission member is welded to the constituent material of the second layer,
the first layer is a fiber layer, and
the second wire-like transmission member is welded to a portion of the constituent material of the second layer seeping into the fiber layer.

7. The wiring member according to claim 6, wherein a melting point of the constituent material of the first layer is higher than a melting point of the constituent material of the second layer.

8. A wiring member, comprising:
a sheet member including a first layer and a second layer;
a first wire-like transmission member; and
a second wire-like transmission member, wherein
a constituent material of the first layer and a constituent material of the second layer are different from each other,
a material of a surface of the first wire-like transmission member and a material of a surface of the second wire-like transmission member are different from each other,
the first wire-like transmission member is welded to the constituent material of the first layer,
the second wire-like transmission member is welded to the constituent material of the second layer,
the first wire-like transmission member is welded to the first layer from a side opposite to the second layer, and
the second wire-like transmission member is welded to the second layer from a side opposite to the first layer.

* * * * *